（12）United States Patent
Fan et al.

(10) Patent No.: US 9,318,730 B2
(45) Date of Patent: Apr. 19, 2016

(54) TRAY FOR HOLDING POUCH-TYPE BATTERIES

(75) Inventors: Chiang-Cheng Fan, Taoyuan Hsien (TW); Lee-Yi Cheng, Taoyuan Hsien (TW)

(73) Assignee: CHROMA ATE INC., Taoyuan Hsien (TW)

( * ) Notice: Subject to any disclaimer, the term of this patent is extended or adjusted under 35 U.S.C. 154(b) by 986 days.

(21) Appl. No.: 13/492,472

(22) Filed: Jun. 8, 2012

(65) Prior Publication Data

US 2012/0312719 A1 Dec. 13, 2012

(30) Foreign Application Priority Data

Jun. 13, 2011 (TW) ............................. 100120600 A

(51) Int. Cl.
*H01M 2/10* (2006.01)
*H01M 2/02* (2006.01)

(52) U.S. Cl.
CPC .......... *H01M 2/1077* (2013.01); *H01M 2/1061* (2013.01); *H01M 2/0207* (2013.01)

(58) Field of Classification Search
CPC ............ H01M 2/1016; H01M 2/1061; H01M 2/1077; H01M 2/10
See application file for complete search history.

(56) References Cited

U.S. PATENT DOCUMENTS

| 2007/0266553 | A1* | 11/2007 | Schlogl ........................ 29/623.1 |
| 2008/0280195 | A1 | 11/2008 | Kumar et al. |
| 2010/0306995 | A1 | 12/2010 | Scheuerman et al. |
| 2011/0318623 | A1 | 12/2011 | Lee et al. |

FOREIGN PATENT DOCUMENTS

| CN | 2832343 Y | 11/2006 |
| CN | 101061598 A | 10/2007 |
| CN | 101682008 A | 3/2010 |
| CN | 101908646 A | 12/2010 |
| WO | WO2010/050697 A2 | 5/2010 |

OTHER PUBLICATIONS

Office Action from State Intellectual Property Office of People's Republic of China in corresponding Chinese application 201110165210.2 dated Dec. 16, 2014, 8 pp. in Chinese.
Office Action from China State Intellectual Property Office in the corresponding Chinese application 2011101652102 dated Mar. 26, 2014, 9 pp. in Chinese.

* cited by examiner

*Primary Examiner* — Edu E Enin-Okut
(74) *Attorney, Agent, or Firm* — Juan Carlos A. Marquez; Bacon & Thomas PLLC

(57) ABSTRACT

A tray for placing a plurality of pouch-type batteries is provided. The tray includes a frame, at least a drive shaft, a plurality of fixed plates and a plurality of movable plates. The drive shaft is slidably fixed to the frame along a drive axis, where the drive shaft has a positioning device for fixing a relative position of the drive shaft with respect to the frame. The fixed plates are perpendicular to the drive axis, and are arranged in order along the drive axis and fixed within the frame. The movable plates are also perpendicular to the drive axis, and are arranged in order along the drive axis within the frame, and the movable plates are interlaced with the fixed plates. The movable plates are moved together with the drive shaft, and each of the movable plates and each of the fixed plates define a receiving space for receiving the pouch-type battery, and are used for clamping each of the pouch-type batteries.

19 Claims, 5 Drawing Sheets

TRAY FOR HOLDING POUCH-TYPE BATTERIES

BACKGROUND OF THE INVENTION

1. Field of the Invention

The present invention relates to a tray, and in particular to a tray for placing a plurality of pouch-type batteries.

2. Description of the Related Art

Presently, with the rapid development of technology, various electronic products, such as mobile phones, tablet PCs, notebooks, even electric vehicles, need long-lasting batteries to supply power and prolong service time. Due to their high energy storage density and low memory effect, lithium batteries are widely applied in numerous electronic products and are currently a highly anticipated type of battery.

In the manufacturing process of lithium batteries, it is necessary to perform processes in advance such as formation and first-time charging, so that a semi-finished product can become a completed product. In the formation process, electrodes of the semi-finished lithium battery product are energized, so that chemical compositions in a fluid state inside the semi-finished lithium battery product form a chemical structure in a solid state capable of storing electric energy. Before the formation process of a pouch-type battery, the chemical compositions in a fluid state inside the semi-finished product are filled in a soft pouch; so that during the formation process, a uniform force needs to be applied to maintain the shape of the semi-finished product.

However, in the mass production of pouch-type batteries, the method by which a uniform and evenly distributed force can be applied to each pouch-type battery is a topic of significance.

SUMMARY OF THE INVENTION

The present invention is directed to a tray for placing a plurality of pouch-type batteries, which can apply a uniform and evenly distributed force on each of the pouch-type batteries.

In order to achieve the objective mentioned above, the tray for placing a plurality of pouch-type batteries of the present invention includes a frame, at least one drive shaft, a plurality of fixed plates and a plurality of movable plates. The drive shaft is slidably fixed to the frame along a drive axis, and has a positioning device for fixing a relative position of the drive shaft with respect to the frame. The fixed plates are perpendicular to the drive axis, and are arranged in order along the drive axis and fixed within the frame. The movable plates are also perpendicular to the drive axis, and are arranged in order along the drive axis within the frame. The movable plates are interlaced with the fixed plates. Therein, the movable plates are moved together with the drive shaft, and each of the movable plates and each of the fixed plates define a receiving space for receiving each of the pouch-type batteries, and are used for clamping each of the pouch-type batteries. The tray of the present invention can apply a uniform and evenly distributed force on each of the pouch-type batteries.

BRIEF DESCRIPTION OF THE DRAWINGS

The invention will be described according to the appended drawings in which.

PREFERRED EMBODIMENT OF THE PRESENT INVENTION

Figure 1A:
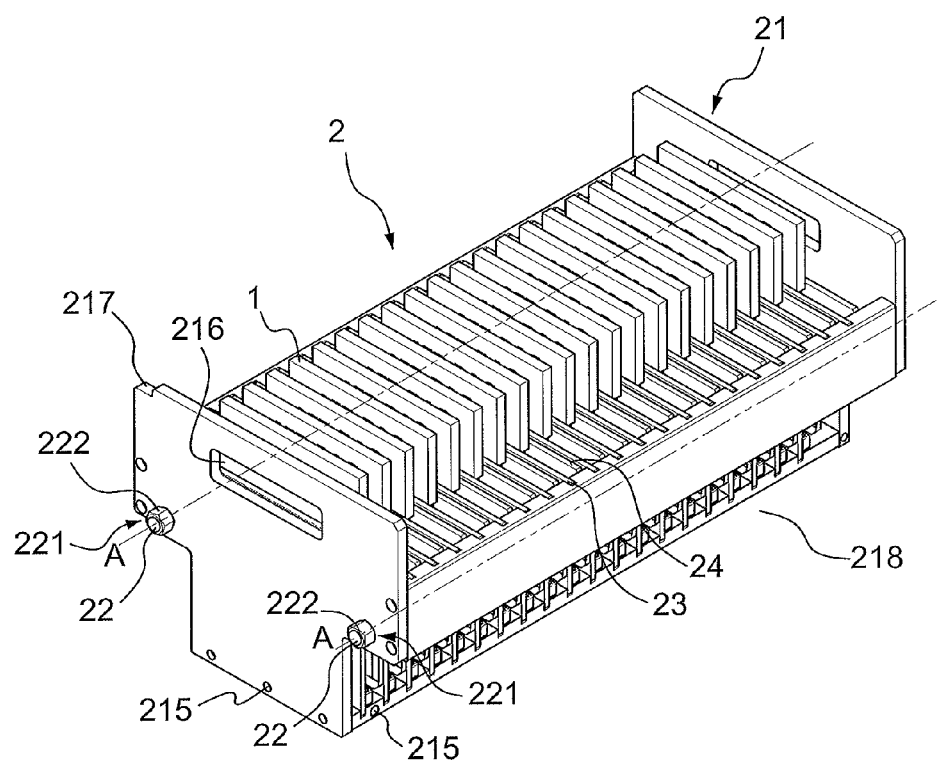
FIG. 1A is a schematic perspective view of a tray of the present invention from one direction.
Figure 1B:
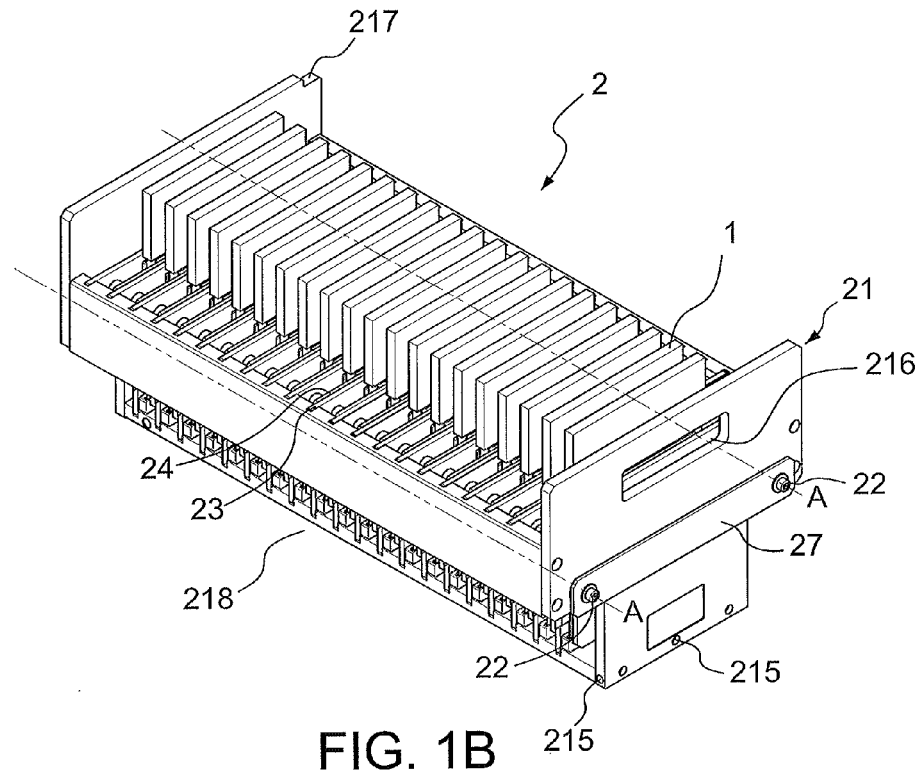
FIG. 1B is a schematic perspective view of the tray of the present invention from another direction.
Figure 1C:
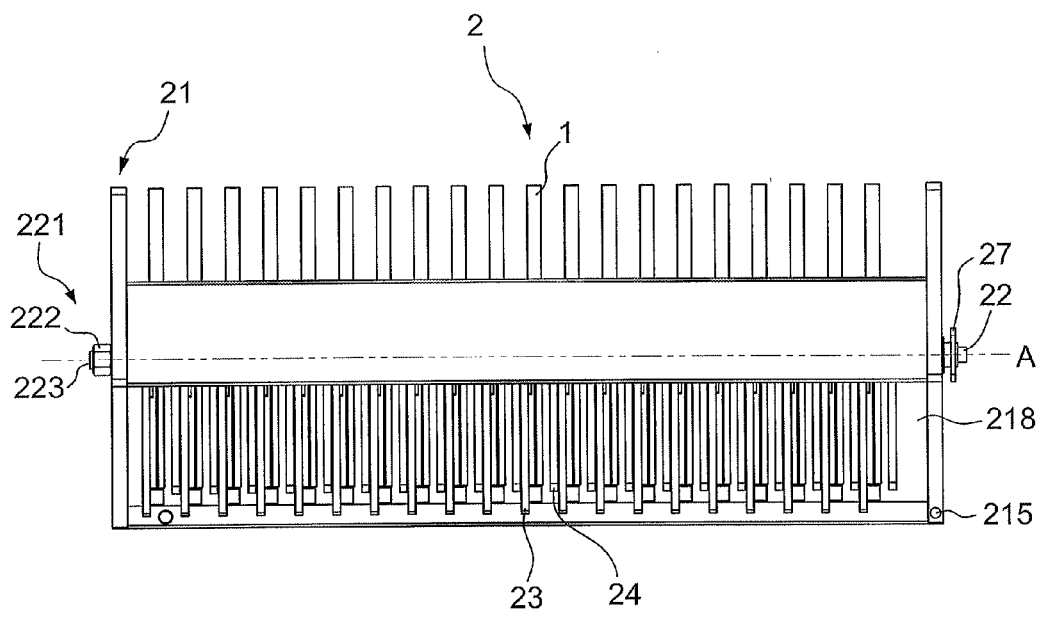
FIG. 1C is a schematic side view of the tray of the present invention.

First, referring to FIG. 1A, FIG. 1B, and FIG. 1C, a tray 2 in accordance with a preferred embodiment of the present invention is used for placing a plurality of pouch-type batteries 1. The tray 2 includes a frame 21, at least one drive shaft 22 (in the current embodiment, two drive shafts 22), a plurality of fixed plates 23, and a plurality of movable plates 24. Each of the drive shafts 22 is slidably fixed to the frame 21 along a drive axis A, wherein each of the drive shafts 22 has a positioning device 221 for fixing a relative position of the drive shaft 22 with respect to the frame 21. The fixed plates 23 are perpendicular to the drive axis A and are arranged in order along the drive axis A and fixed within the frame 21. The movable plates 24 are also perpendicular to the drive axis A and are arranged in order along the drive axis A within the frame 21, and the movable plates 24 are interlaced with the fixed plates 23. Further, the movable plates 24 are moved together with the drive shaft 22, and each of the movable plates 24 and each of the fixed plates 23 define a receiving space for receiving each of the pouch-type batteries 1 and are used for clamping each of the pouch-type batteries 1.

After semi-finished pouch-type battery 1 products are placed in the receiving spaces between the movable plates 24 and the fixed plates 23, and before the formation process, a force is applied on the drive shaft 22, so that the drive shaft 22 slides with respect to the frame 21 to a pre-determined relative position. Then, the movable plates 24 are driven by the drive shaft 22 and apply a uniform and evenly distributed force on all the semi-finished pouch-type battery 1 products clamped between the movable plates 24 and the fixed plates 23. At this time, the relative position of the drive shaft 22 with respect to the frame 21 is fixed by the positioning device 221, so that a uniform and evenly distributed force is continuously and simultaneously applied on the all the semi-finished pouch-type battery 1 products during the formation process.

Figure 4A:
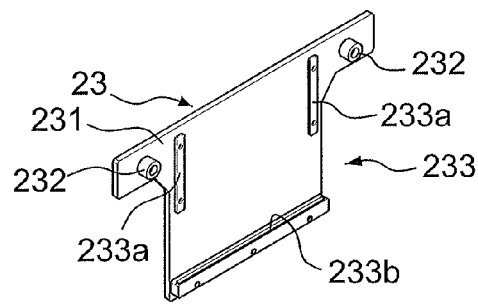
FIG. 4A is a schematic view of a fixed plate of the present invention.
Figure 4B:
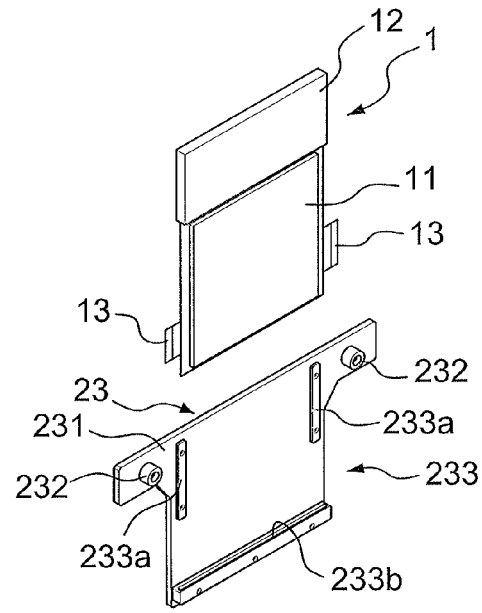
FIG. 4B is a schematic exploded view of the fixed plate and pouch-type battery of the present invention.
Figure 4C:
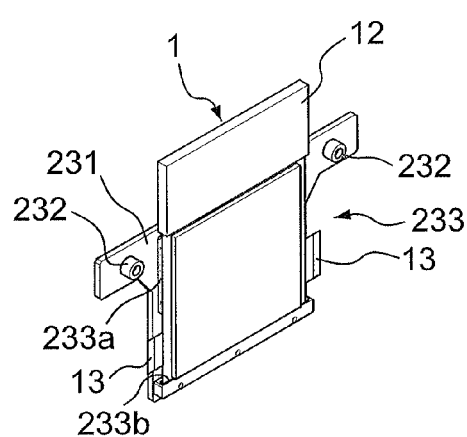
FIG. 4C is a schematic assembled view of the fixed plate and pouch-type battery of the present invention.

As for the semi-finished pouch-type battery 1 product, reference can be made to FIG. 4B and FIG. 4C. In addition to a body 11 and two electrodes 13, the pouch-type battery 1 further has an airbag 12 in gas communication with the body 11. When the electrodes 13 of the semi-finished products of the pouch-type batteries 1 are energized to perform the formation process, the airbags 12 collect gas generated by chemical compositions in the semi-finished pouch-type battery 1 products. At this time, the tray 2 of the present invention applies a uniform and evenly distributed force on the semi-finished products of the pouch-type batteries 1 through the movable plates 24. After the formation process is completed, the site where the airbag 12 of the pouch-type battery 1 is in communication with the body 11 is closed and the airbag 12 is cut out.

Figure 2A:
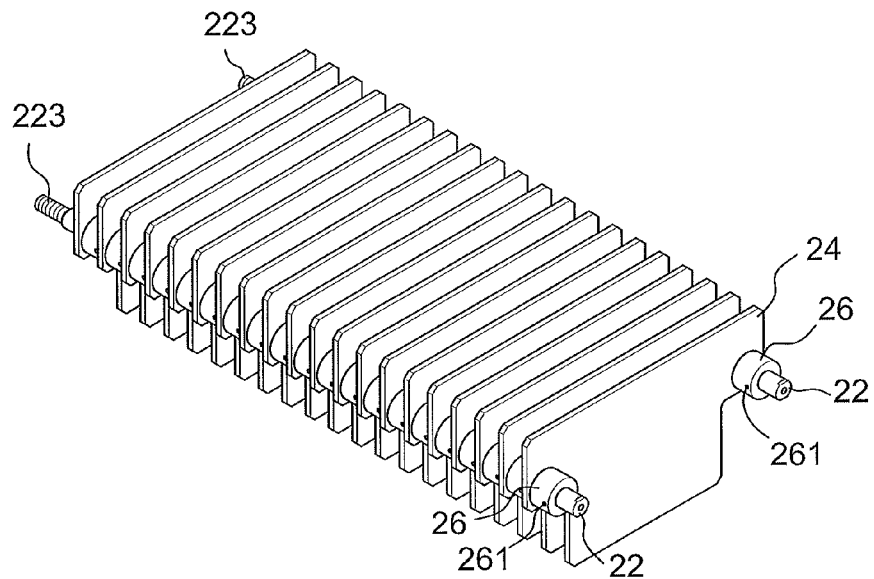
FIG. 2A is a schematic assembled view of a movable plate assembly of the tray of the present invention.
Figure 2B:
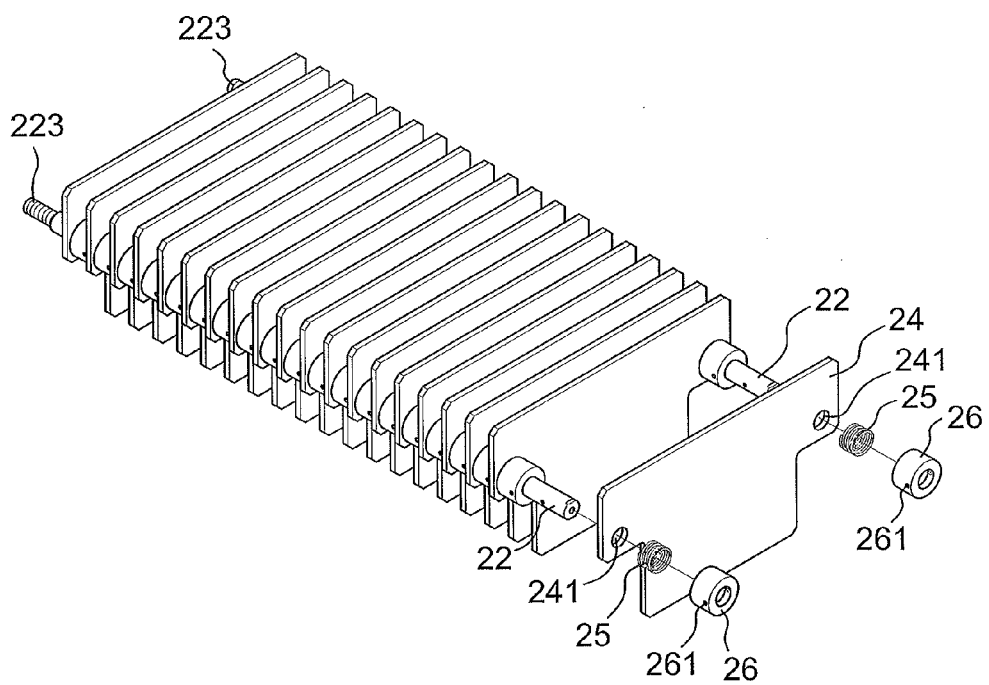
FIG. 2B is a partial schematic exploded view of the movable plate assembly of the tray of the present invention.
Figure 2C:
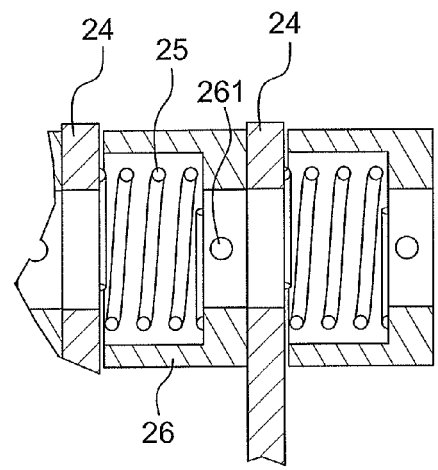
FIG. 2C is a partial schematic cross-sectional view of the movable plate assembly of the tray of the present invention.

Referring to FIG. 2A, FIG. 2B, and FIG. 2C, the tray 2 of the present invention further includes a plurality of elastic devices 25. In FIG. 2C, the relationships between the movable plates 24 and the elastic devices 25 can be shown more clearly when the drive shaft 22 is not shown. Each of the elastic devices 25 connects the drive shaft 22 and each of the movable plates 24. The drive shaft 22 drives the elastic devices 25, and the elastic devices 25 further apply a plurality of even elastic forces on the pouch-type batteries 1 through the movable plates 24. Therefore, in the tray 2 of the present invention, the difference in the forces applied on the different pouch-type batteries 1, caused by slight differences in the thickness of individual pouch-type batteries 1 and the same distance that different movable plates 24 move with the drive shaft 22, can be further reduced by means of the elastic devices 25.

The tray 2 of this embodiment includes two drive shafts 22. As shown in FIG. 2A and FIG. 2B, the two drive shafts 22 respectively pass through a left side and a right side of each of the movable plates 24, and each of the elastic devices 25 connects one of the drive shafts 22 and each of the movable plates 24, so as to uniformly apply a force on the pouch-type batteries 1. Each of the movable plates 24 accordingly forms a perforation 241 corresponding to each of the drive shafts 22, and the drive shafts 22 respectively pass through the corresponding perforations 241. In a preferred embodiment, the elastic devices 25 of the present invention are a plurality of helical springs, and the drive shafts 22 pass through the corresponding helical springs.

As shown in FIG. 2A, FIG. 2B, and FIG. 2C, the tray 2 of this embodiment includes a plurality of stop rings 26. Each of the stop rings 26 is respectively disposed between the movable plates 24 and fixed around one of the drive shafts 22 to limit a plurality of pitches between the movable plates 24, and each of the elastic devices 25 is received in each of the stop rings 26. Each of the elastic devices 25 is pressed against each of the stop rings 26 and each of the movable plates 24, so that the movable plates 24 can be driven by the drive shaft 22 through the elastic devices 25 and the stop rings 26. In a preferred embodiment, each of the stop rings 26 has a positioning hole 261, and each of the stop rings 26 is locked and fixed with the corresponding drive shaft 22 through the positioning hole 261.

Figure 3:
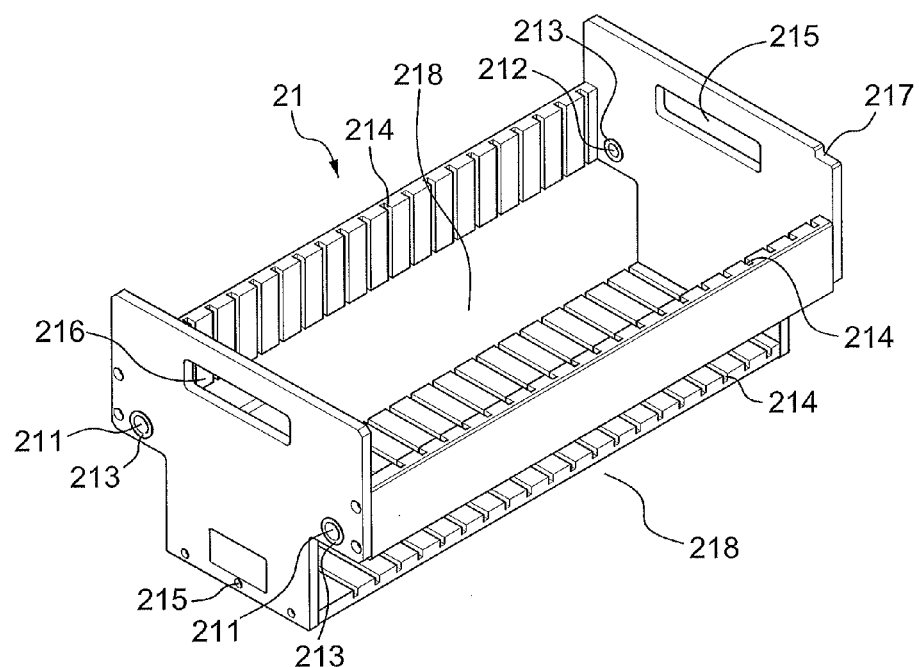
FIG. 3 is a schematic perspective view of a frame of the present invention.

Referring to FIG. 1B, FIG. 1C, and FIG. 3, the tray 2 of the present invention preferably further includes a drive shaft connector 27. A first end of each of the drive shafts 22 passes out through a corresponding first slide hole 211 of the frame 21 along drive axis A, and the drive shaft connector 27 is used for fixing all the first ends of the drive shafts 22 and is pressed against a first outer surface of the frame 21. Before the formation process, a force may be applied on the drive shaft connector 27 by using a device such as a cylinder to enable all the drive shafts 22 to slide with respect to the frame 21 to a pre-determined relative position, and then the relative position of the drive shafts 22 with respect to the frame 21 is fixed by the positioning device 221.

Referring to FIG. 1A, FIG. 1C, and FIG. 3, in this embodiment, the positioning device 221 of each of the drive shafts 22 includes a nut 222. A second end of each of the drive shafts 22 passes out from a corresponding second slide hole 212 of the frame 21 along the drive axis A and forms an external thread 223. The nut 222 of the positioning device 221 is used for engaging with the external thread 223 and is pressed against a second outer surface of the frame 21, so as to fix the relative position of the drive shafts 22 with respect to the frame 21.

Referring to FIG. 4A, each of the fixed plates 23 of the present invention includes a plate body 231 and at least one stop bump 232. The plate body 231 is fixed to the frame 21, and the stop bump 232 is disposed on a side surface of the plate body 231 for clamping the pouch-type battery 1, and contacts with the corresponding movable plate 24, so as to limit a pitch between each of the movable plates 24 and each of the fixed plates 23 and prevent the pouch-type battery 1 from being excessively compressed. In this embodiment, each of the fixed plates 23 includes two stop bumps 232, respectively disposed on the left and right sides of the side surface of the plate body 231, clamping each of the pouch-type batteries 1, so as to uniformly press against and limit the pitch between each of the movable plates 24 and each of the fixed plates 23. The thickness of the stop bumps 232 is preferably less than the thickness of the stop rings 26.

Referring to FIG. 4A each of the fixed plates 23 preferably includes a pouch-type battery positioning rack 233, which is disposed on the side surface of the plate body 231 for clamping each of the pouch-type batteries 1, and positions the pouch-type batteries 1. The pouch-type battery positioning rack 233 includes two guide strips 233a and a positioning groove 233b. The guide strips 233a extend vertically and are respectively disposed on the left right sides of the side surface of the plate body 231 of each of the fixed plates 23 for clamping each of the pouch-type batteries 1. The positioning groove 233b is disposed on a bottom side of the side surface of the plate body 231 of each of the fixed plates 23 for clamping each of the pouch-type batteries 1. Thus, as shown in FIG. 4B and FIG. 4C, when each of the pouch-type batteries 1 is placed into the tray 2 of the present invention from the top, the left side, the right side and the bottom side of each of the pouch-type batteries 1 are respectively positioned in the tray 2 through the guide strips 233a and the positioning groove 233b.

Referring to FIG. 3, in this embodiment, the frame 21 includes a plurality of oil-free bushings 213 for contacting and slidably fixing the drive shafts 22, and the frame 21 includes a plurality of grooves 214 for respectively fitting and fixing the fixed plates 23.

In this embodiment, as in the preferred embodiment of the frame 21, reference can be made to FIG. 1A, FIG. 1B, and FIG. 3. The frame 21 is formed with a plurality of positioning holes 215 for positioning the tray 2, for example, in a process apparatus for the pouch-type batteries 1. The frame 21 has two hand-grip holes 216 disposed at a front side and a rear side of the frame 21 along the drive axis A to facilitate the operation of the tray 2 of the present invention. The frame 21 is formed with a direction identification notch 217 disposed at either the front side or the rear side of the frame 21 along the drive axis A for identifying a direction of the tray 2. Moreover, the frame 21 has two openings 218 disposed corresponding to left sides and right sides of the pouch-type batteries 1 for exposing two electrodes 13 at the left and right sides of each of the pouch-type batteries 1 to facilitate the electrical connection between the process apparatus and the electrodes 13 of the pouch-type battery 1, and to help perform the formation process or other charging processes.

When the pouch-type batteries 1 are placed in the tray 2 of the present invention, the drive shafts 22 can drive the movable plates 24 to move, and the positioning devices 221 fix the relative position of the drive shafts 22 with respect to the frame 21 and thereby apply a uniform and evenly distributed force on all the semi-finished pouch-type battery 1 products clamped between the movable plates 24 and the fixed plates 23, so as to achieve the objective of the present invention.

The above-described embodiments of the present invention are intended to be illustrative only. Numerous alternative embodiments may be devised by persons skilled in the art without departing from the scope of the following claims.

What is claimed is:

1. A tray for placing a plurality of pouch-type batteries comprising:
    a frame;
    at least one drive shaft, slidably fixed to the frame along a drive axis, wherein the drive shaft has a positioning device for fixing a relative position of the drive shaft with respect to the frame;
    a plurality of fixed plates, perpendicular to the drive axis and arranged in order along the drive axis and fixed within the frame;
    a plurality of movable plates, perpendicular to the drive axis and arranged in order along the drive axis within the frame, wherein the movable plates are interlaced with the fixed plates;
    wherein the movable plates are operatively connected to and move together with the drive shaft, and each of the movable plates and each of the fixed plates define a receiving space for receiving each of the pouch-type batteries, and
    each of the movable plates is spaced apart from each of the fixed plates so as to movably form a pitch between each movable plate a corresponding fixed plate and thereby cooperate to clamp each of the pouch-type batteries therebetween; and
    a plurality of elastic devices, wherein each of the elastic devices connects to and is pressed against a portion of the drive shaft and each of the movable plates, and the elastic devices apply a plurality of even elastic forces on the pouch-type batteries through the movable plates.

2. The tray according to claim 1, wherein each of the movable plates forms a perforation corresponding to the drive shaft, and the drive shaft passes through the perforation.

3. The tray according to claim 1, further comprising a plurality of stop rings respectively disposed between the movable plates and fixed around the drive shaft to limit a plurality of pitches between the movable plates, and each of the elastic devices being received in each of the stop rings.

4. The tray according to claim 3, wherein each of the elastic devices is pressed against each of the stop rings and each of the movable plates.

5. The tray according to claim 1, wherein the tray comprises two drive shafts respectively passing through the left right sides of each of the movable plates, and each of the elastic devices connects one of the drive shafts and each of the movable plates.

6. The tray according to claim 5, further comprising a drive shaft connector, wherein a first end of each of the drive shafts passes out from a corresponding first slide hole of the frame along the drive axis, the drive shaft connector is used for fixing the first ends of the drive shafts and is pressed against a first outer surface of the frame, and after a force is applied on the drive shaft connector to enable the drive shaft to slide with respect to the frame to the relative position, the relative position of the drive shaft with respect to the frame is fixed by the positioning device.

7. The tray according to claim 6, wherein the positioning device of each of the drive shafts comprises a nut, a second end of each of the drive shaft passes out from a corresponding second slide hole of the frame along the drive axis and forms an external thread, and the nut is used for engaging with the external thread and is pressed against a second outer surface of the frame to fix the relative position of the drive shafts with respect to the frame.

8. The tray according to claim 3, wherein each of the stop rings has a positioning hole, and each of the stop rings is locked and fixed with the drive shaft through the positioning hole.

9. The tray according to claim 1, wherein the elastic devices are a plurality of helical springs, and the drive shafts pass through the corresponding helical springs.

10. The tray according to claim 1, wherein each of the fixed plates comprises a plate body and at least one stop bump, the plate body is fixed to the frame, and the stop bump is disposed on a side surface of the plate body for clamping each of the pouch-type batteries, and contacts with the corresponding movable plate, so as to limit pitches between each of the movable plates and each of the fixed plates.

11. The tray according to claim 10, wherein each of the fixed plate comprises a pouch-type battery positioning rack, and the pouch-type battery positioning rack is disposed on the side surface of the plate body for positioning the pouch-type battery.

12. The tray according to claim 11, wherein each of the pouch-type battery positioning racks comprises two guide strips and a positioning groove, the guide strips extend vertically and are respectively disposed at the left and right sides of the side surface of the plate body of each of the fixed plates, the positioning groove is disposed at a bottom side of the side surface of the plate body of each of the fixed plates, and a left side, a right side, and a bottom side of each of the pouch-type batteries are respectively positioned in the tray through the guide strips and the positioning groove.

13. The tray according to claim 10, wherein each of the fixed plates comprises two stop bumps respectively disposed at a left side and a right side of the side surface of the plate body for clamping each of the pouch-type batteries.

14. The tray according to claim 1, wherein the frame comprises a plurality of oil-free bushings for contacting with and slidably fixing the drive shafts.

15. The tray according to claim 1, wherein the frame has two openings disposed corresponding to left sides and right sides of the pouch-type batteries for exposing two electrodes at the left side and the right side of each of the pouch-type batteries.

16. The tray according to claim 1, wherein the frame comprises a plurality of grooves for fitting and fixing the fixed plates.

17. The tray according to claim 1, wherein the frame is formed with a plurality of positioning holes for positioning the tray.

18. The tray according to claim 1, wherein the frame has two hand-grip holes disposed at a front side and a rear side of the frame along the drive axis.

19. The tray according to claim 1, wherein the frame is formed with a direction identification notch disposed at either a front side or a rear side of the frame along the drive axis for identifying a direction of the tray.

* * * * *